United States Patent
Smith et al.

[11] 3,786,777
[45] Jan. 22, 1974

[54] IRREVERSIBLE WARM-UP INDICATOR

[75] Inventors: Robert W. Smith, Oakton, Va.; Fred Ordway, Bethesda, Md.; Charles A. Taylor, Falls Church; William Zimmerman, III, Alexandria, both of Va.

[73] Assignee: Artech Corporation, Falls Church, Va.

[22] Filed: Dec. 31, 1970

[21] Appl. No.: 103,146

[52] U.S. Cl. .......................................... 116/114 AB
[51] Int. Cl. ................................ A23 , G01d 21/00
[58] Field of Search...... 99/192 TI, 211; 116/114 V, 116/114 Y, 114 AM, 114 AB; 73/356; 23/253 R

[56] References Cited
UNITED STATES PATENTS

| | | | |
|---|---|---|---|
| 2,460,215 | 1/1949 | Chase............................. | 99/192 TI |
| 2,490,933 | 12/1949 | Tornquist et al. .......... | 116/114 V X |
| 2,785,057 | 3/1957 | Schwab et al................. | 23/253 TP |
| 2,823,131 | 2/1958 | Power............................. | 99/192 TI |
| 3,002,385 | 10/1961 | Wahl et al..................... | 99/192 TI X |
| 3,047,405 | 7/1962 | Lanier............................. | 99/192 TI |
| 3,067,015 | 12/1962 | Lawdermilt................... | 99/192 TI X |
| 3,177,843 | 4/1965 | Geocaris....................... | 99/192 TI X |
| 3,336,212 | 8/1967 | Nicholas et al.............. | 73/356 X |

Primary Examiner—Norman Yudkoff
Assistant Examiner—Kenneth P. Van Wyck
Attorney, Agent, or Firm—Brufsky, Staas, Breiner and Halsey

[57] ABSTRACT

An indicator for use with a refrigerated object to indicate visually that the object has rewarmed and to warn of possible spoilage. The indicator includes a transparent package housing a frangible container filled with a liquid that expands on freezing and an indicator material placed in proximity thereto which will undergo a color change when contacted by the liquid. The liquid freezes when refrigerated along with the object and expands fracturing the container which previously prevented communication between the liquid and indicator material. Rewarming of the object causes the liquid to melt and contact the indicator material to record by a change of color in the indicator material the fact that the object has rewarmed, even if subsequently recooled. Resilient pressure means, such as a foam pad, an elastic ring, a helical compression spring, a compressed gas bag, an indenter, resilient tongues formed in the indicator material, or equivalent structure is provided in the package between the container and a wall of the package to assure liquid flow from the container in the event of its incomplete or local fracture.

19 Claims, 10 Drawing Figures

PATENTED JAN 22 1974

INVENTORS
ROBERT W. SMITH
FRED ORDWAY
CHARLES A. TAYLOR
WILLIAM ZIMMERMAN, III

BY *Brufsky, Staas, Breiner & Halsey*

ATTORNEYS 3,786,777

IRREVERSIBLE WARM-UP INDICATOR

BACKGROUND OF THE INVENTION

1. Field of the Invention

This invention relates to a temperature indicator, and more particularly, an indicator which is adapted to be used in conjunction with a refrigerated object to indicate that the object has been rewarmed subsequently to its initial cooling to the refrigeration temperature. Inasmuch as the most common use of refrigerated storage is to maintain a frozen state, the cooling to a refrigeration temperature below room temperature and the rewarming substantially above the refrigeration temperature will hereafter be indicated by "freezing" and "thawing" respectively.

2. Description of the Prior Art

The freezing of food, biologicals, and other materials frequently requires that temperature levels well below 0°F. be maintained. After such freezing it is important to know whether the required low temperatures have been maintained during transport or storage of the frozen material and, if not, to have an indication of the time lapse during which any thawing of the frozen object may have occurred. In the case of frozen food, for example, it is essential to the purchaser and to the distributor of the food to know whether the frozen food has been accidentally thawed for an appreciable time during shipment or storage. Once thawed, the formerly frozen food is subjected to spoiling, which would be masked by subsequent refreezing. Frozen food which has been allowed to thaw and which has thereafter been refrozen may cause food poisoning, or may become distasteful.

Attempts have heretofore been made to provide warning or tell-tale devices in conjunction with quick frozen food packages which are designed to apprise the purchaser of the fact that a thawing of the package has occurred intermediate its preparation and the time of purchase.

Two of the most common types of such a device are illustrated in U.S. Letters Patent Nos. 2,460,215 and 2,823,131. The warm-up indicating devices illustrated in these patents comprise a package which is affixed to the frozen object. Contained within the package is a capsule or container filled with a liquid which is expansible upon freezing. When frozen, the liquid expands and will fracture the container. The container is placed in proximity to an indicator material. The indicator material is adapted to change color when contacted by the liquid to apprise the purchaser of the frozen object that the object has thawed. The indicator material can constitute litmus paper or absorbent material impregnated with a dye which will turn color upon contact with the liquid.

When the object is frozen, the liquid within the container will be subjected to the same freezing process. Upon freezing, the liquid within the package will expand and break its container to enable communication to be established between the interior of the container (or liquid) and the indicator material. When the frozen object is subjected to a temperature such as to cause it to thaw, the frozen liquid will also melt, as its melting point is chosen so as to approximate the melting point of the frozen object. Upon melting, the liquid will come in contact with the indicator material, causing it to undergo a change in color which will immediately be visible to a purchaser to indicate that thawing has occurred.

The process is irreversible in that should the object be subsequently refrozen, the visual indication that the object had undergone a thawing operation will still be evident.

The capsule or container housing the expansible liquid is often composed of a wax or plastic, because of the desirable properties of such materials for use in known encapsulation processes. However, such materials may have a certain ductility or toughness, which leads them to fracture locally or incompletely at the time of freezing. Moreover, such materials may have a hydrophobic or liquid-repellent surface character that tends to prevent flow of the liquid through cracks in the wall of the capsule. Accordingly, while the concept employed in the prior art warm-up indicators is theoretically sound, they often fail in practice, because insufficient liquid material comes in contact with the indicator material after thawing of the frozen object to provide a meaningful color change indication.

SUMMARY OF THE INVENTION

This invention overcomes the noted deficiency in the prior art warm-up indicators by the use of a positive pressure means within the indicator package to exert a force on the frangible container to assure that liquid will flow from the interior of the container after fracture into intimate contact with the indicator material, thereby improving its reliability.

The pressure exerting means utilized in the temperature indicator package of the present invention may take a variety of forms.

In general, the pressure exerting means includes a resilient member positioned between the frangible container housing the expansible liquid and the walls of the temperature indicator package. The resilient member exerts a force on the container which is sufficient in magnitude to cause the liquid to be drained from its container by compressing or deforming the container after it has cracked and melting has taken place. However, the pressure exerted is much less than would normally be needed to prematurely burst the capsule when it is filled with liquid. Therefore, the comparatively small pressure exerted by the resilient member upon the container has a negligible effect on the overall process which calls for the container to be fractured by expansion of the liquid upon freezing.

One specific form of the invention consists of placing a resilient polyurethane foam pad under the frangible container and indicator material urging the container against an adjacent wall of the indicator package so that the container is compressed with a force sufficient to cause the liquid to flow into intimate contact with the indicator material after fracture of the container. Similar embodiments include the use of either a helical compression spring, a ring of thin elastic material, or a gas held captive within the indicator package between the container and an adjacent wall of the package to exert pressure on the container after fracture.

Still another form of the invention contemplates modification of a conventional indicator package wherein a plurality of resilient tongues can be formed by slitting the indicator material to provide a seat for the frangible capsule or container. The seat exerts a pressure on the container by holding it captive against an adjacent package wall.

The frangible container can even be formed directly in one of the walls of the package by deforming the surface of the package to provide a liquid enclosure or chamber and a seal can be positioned across the deformations within the interior of the package. An indenter having a convex surface is positioned so as to exert a bearing force on the seal, whereupon after rupture of the seal by the expanding liquid, the indenter will squeeze the liquid from the formed chamber into contact with the indicator material.

Further objects and advantages of the present invention will become apparent from the following description and claims, and from the accompanying drawings, wherein:

DETAILED DESCRIPTION OF THE PREFERRED EMBODIMENTS

Figure 1:
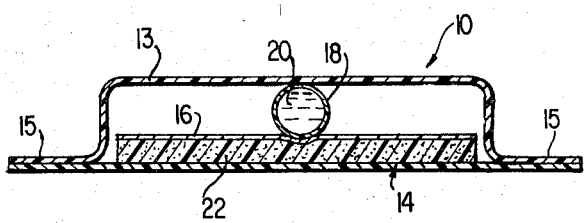
FIG. 1 is a longitudinal cross-sectional view of one embodiment of the warm-up indicator comprising the subject matter of the instant invention.
Figure 2:
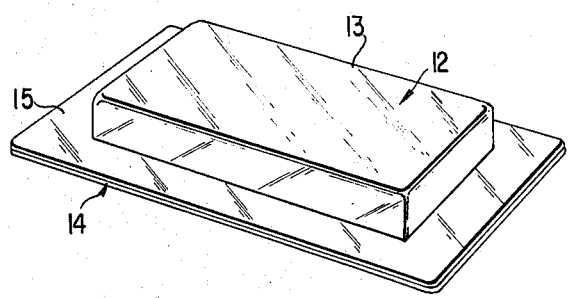
FIG. 2 is a perspective view of the warm-up indicator illustrated in FIG. 1.

Referring now specifically to the drawings in detail wherein like numerals indicate like elements throughout the several views, one form of warm-up indicator constructed in accordance with the principles of the present invention is illustrated in FIGS. 1 and 2 by the numeral 10.

Indicator 10 includes a package or envelope of transparent plastic material including an upper portion 12 having a dome 13. A flange 15 integral with and extending about the periphery of dome 13 is sealed to a bottom portion 14 of indicator 10, which consists of planar, transparent plastic sheet.

Affixed to bottom portion 14 of indicator 10 is a resilient polyurethane foam pad 22 having a density of approximately 1 to 2 pounds per cubic foot which in ⅛-in. thickness is compressed approximately 75 percent by a pressure of one-half to 1 pound per square inch. A sheet of indicator material 16, which can take the form of an absorbent layer of paper containing amounts of suitable chemical constituents to produce a visible color reaction on contact with a preselected liquid, is secured to the top surface of foam pad 22. Sealed within the indicator package 10 between indicator material 16 and dome 13 of the package is a wax or plastic frangible capsule or container 18 containing a liquid 20 which is both expansible upon freezing and which when placed in contact with indicator material 16 will produce the visible color reaction referred to above.

As shown in FIG. 1, resilient foam pad 22 urges container 18 against the interior wall of dome 13 and exerts pressure on the exterior surface of container 18 for a purpose discussed in greater detail hereinafter. However, the pressure exerted by the foam is insufficient by itself to cause fracture of container 18.

In use, warm-up indicator 10 is placed in proximity to an object which is to be frozen. For example, indicator 10 can be adhesively secured to the object or otherwise secured by conventional fasteners.

When the object is frozen, liquid 20 within the capsule or container 18 will also freeze as its melting temperature is selected so as to be somewhat higher than the refrigeration temperature. Upon freezing, liquid 20 will expand and fracture the wall of container 18 which may be composed of frangible paraffin wax by way of example, enabling communication to be established between the interior of the container and indicator material 16. Should the frozen object subsequently thaw either during shipment or storage, frozen liquid 20 will melt and in theory would normally flow into contact with indicator material 16 to produce a color change in the material which would be visible through transparent plastic dome 13.

It has been found that capsules or containers such as 18 may have a certain ductility or toughness which will cause them to fracture locally or incompletely at the time of freezing. Moreover, such capsules or containers may have a hydrophobic or liquid-repellent surface character that tends to prevent flow of the liquid through cracks in the wall of the container. To assure liquid flow and the accompanying color change in the indicator material, foam pad 22 is provided to exert pressure on the capsule to cause it to be deformed after fracture so as to squeeze the thawed liquid 20 into contact with indicator material 16.

The means provided to assure adequate liquid flow and thus reliability of the warm-up indicator may take other forms.

Figure 9:
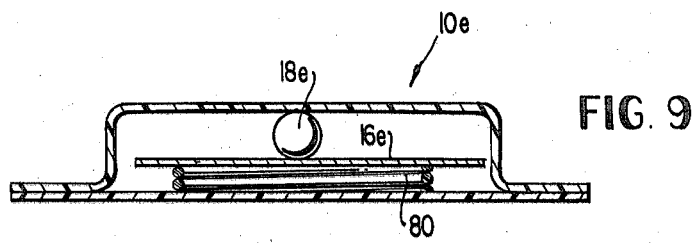
FIG. 9 illustrates still another form of warm-up indicator.

In indicator 10e shown in FIG. 9, a helical compression spring 80 can be utilized in lieu of the foam pad 22 utilized in indicator 10.

Figure 3:
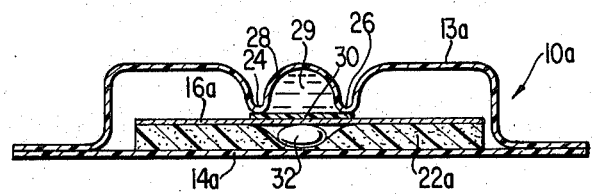
FIG. 3 is a longitudinal cross-sectional view of another embodiment of a warm-up indicator constructed in accordance with the principles of the present invention.

FIG. 3 also illustrates a pair of lateral deformations or creases 24 and 26 formed in the dome 13a of a warm-up indicator 10a to provide a liquid chamber 28 closed by a frangible seal 30 positioned between deformations 24 and 26 or across the mouth of chamber 28. A layer of foam 22a is positioned on bottom planar sheet portion 14a of warm-up indicator 10a. Foam 22a is of the same type as foam 22 in warm-up indicator package 10 and as a consequence of being resilient and compressible, can be used to urge an indenter 32 having a convex or oval surface into contact with an indicator material 16a held captive between the surface of indenter 32 and frangible seal 30. Upon expansion of liquid 29, seal 30 would normally rupture. The pressure exerted by indenter 32 against the seal through indicator material 16a assures that liquid 29 when melted, will flow from chamber 28 through any rupture in seal 30 into contact with indicator material 16a.

Figure 4:
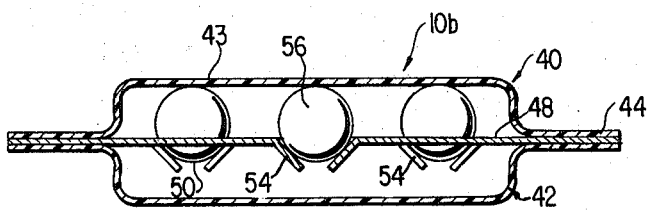
FIG. 4 is a longitudinal cross-sectional view of still another embodiment of a warm-up indicator constructed in accordance with the present invention.
Figure 5:
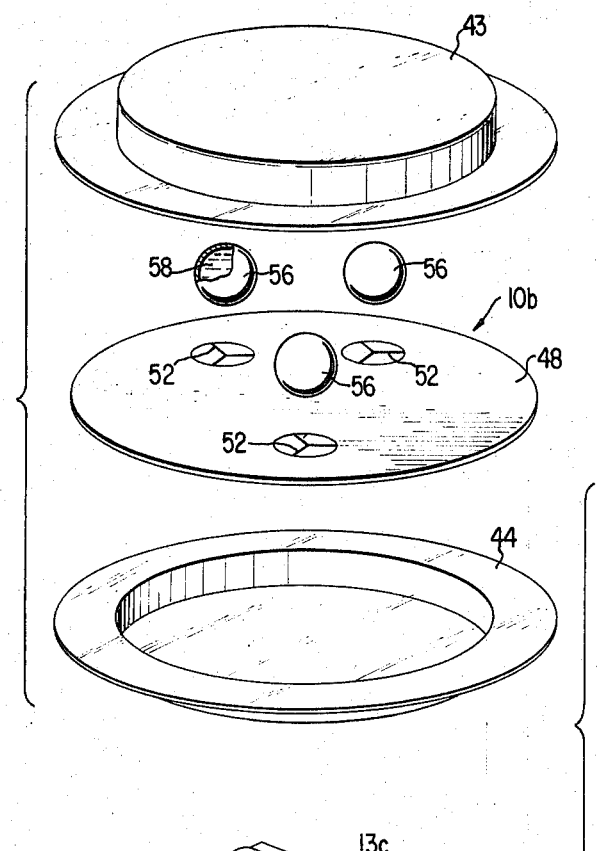
FIG. 5 is an exploded perspective view of the warm-up indicator illustrated in FIG. 4.

FIGS. 4 and 5 illustrate still another modified form of warm-up indicator 10b, which may be utilized not only to indicate that a frozen object has thawed, but which may also serve to indicate the length of time the object was subjected to a thawing temperature.

Warm-up indicator 10b includes an upper portion 40 and a lower portion 42 which are formed from transparent plastic material. Each portion includes a cylindrical dome 43 and an annular rim 44. Upper portion 40 and lower portion 42 are assembled back to back and sandwiched and held captive between their rims 44 is a sheet of indicator material 48.

A plurality of capsule or container seats 50 are formed in indicator material 48 by slitting the material at spaced locations as shown at 52 to form a plurality of tongues 54 adapted to be pushed downwardly from the plane of the sheet of indicator material 48 to form a seat for a spherical capsule or container 56. Indicator material 48 is also resilient so that tongues 54 are adapted to exert pressure upon spherical containers 56 to hold them captive against the adjacent wall of dome 43 of upper portion 40 of indicator 10b. Each spherical container 56 houses an expansible liquid 58, which is selected from a series having progressively higher melting points. One container 56 will contain a liquid whose melting point approximates the melting point of the object frozen, as before.

In use, each of the containers 56 would fracture upon freezing of the object associated with indicator 10b due to expansion of liquid contained therein. If the object is then thawed, the frozen liquid in each of the containers 56 will progressively melt as the temperature of the object is raised. Tongues 54 pressing each spherical container against the adjacent wall of dome 43 to upper portion 40 will exert pressure on the wall of the container to force liquid to flow therefrom into contact with indicator sheet 48.

The amount of color change evident on indicator sheet 48 will be directly proportional to the amount of liquid which reaches indicator sheet 48, which in turn will be a function of the melting temperature of each of the frozen liquids within containers 56. The larger the color change on indicator sheet 48, the longer the thawing process.

Use of more than one capsule or container 56 also provides for increased reliability of warm-up indicator 10b. The probability of failure of fracture, remelting, and flow of liquid to react to produce the required color indication is greatly reduced, because of the multiple containers. Seats 54 also preclude lateral shifting of each of the containers 56 during transportation or handling, thereby decreasing the probability of premature fracture.

Figure 6:
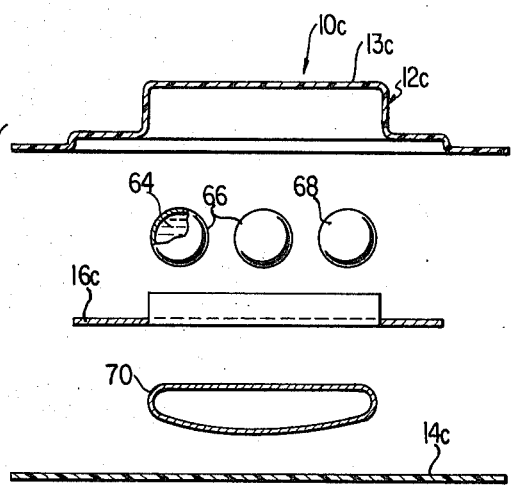
FIG. 6 is an exploded longitudinal cross-sectional view of still another modified form of warm-up indicator constructed in accordance with the present invention.
Figure 7:
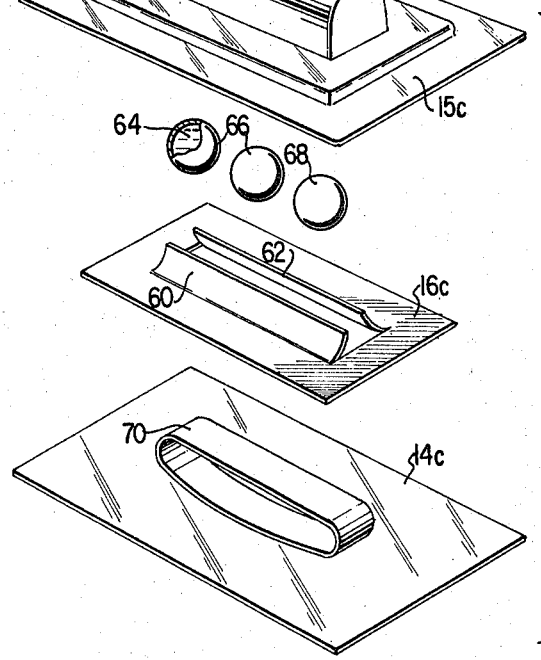
FIG. 7 is an exploded perspective view of the warm-up indicator illustrated in FIG. 6.

FIGS. 6 and 7 illustrate a slightly modified form of warm-up indicator, generally indicated by the numeral 10c. Indicator 10c includes the usual upper portion 12c having a dome 13c. Upper portion 12c is connected to a bottom, transparent planar sheet 14c along an integral rim or flange 15c extending outwardly from dome 13c.

Sandwiched between upper portion 12c and bottom portion 14c is a rectangular sheet of indicator material 16c having a pair of upwardly extending flaps 60 and 62 formed by longitudinally slitting the sheet and bending the adjacent slit flaps upwardly and away from each other.

Spherical capsules or containers 64, 66, and 68 similar in purpose and construction to capsules 56 in warm-up indicator 10b illustrated in FIG. 4 and 5 are positioned in tandem relationship between flaps 60 and 62. A resilient ring 70 of thin plastic tubing is compressed between the bottom of indicator material 16c and bottom planar sheet 14c and will exert a force against the indicator material 16c and spherical containers 64, 66, and 68 to hold the assembly captive against an adjacent wall of dome 13c. Ring 70 also causes sufficient pressure to be exerted against the exterior surfaces of spherical containers 64, 66, and 68 to assure liquid flow after fracture of the containers and remelting of the frozen liquid contained therein.

Figure 8:
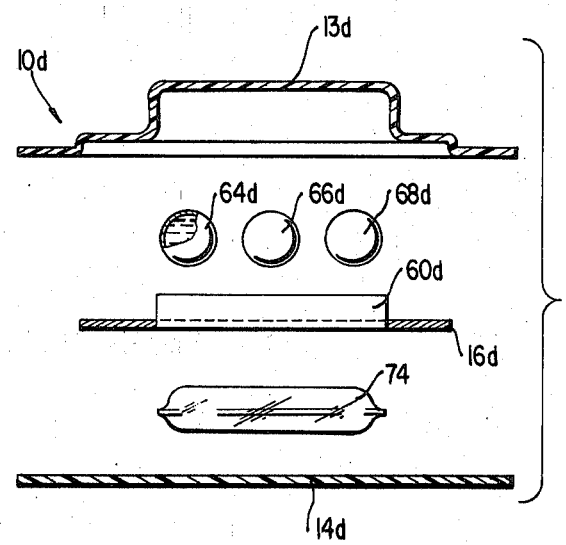
FIG. 8 is an exploded longitudinal cross-sectional view of yet another modified form of warm-up indicator constructed in accordance with the present invention.

Another embodiment of an equivalent warm-up indicator is shown in FIG. 8.

In the warm-up indicator 10d illustrated in FIG. 8, a pressure exerting means comprising a gas under pressure in a container or envelope 74 can be used in lieu of elastic ring 70 to assure liquid flow from spherical containers 64d, 66d, and 68d. Otherwise, the operation of indicator 10d illustrated in FIG. 8 is identical and consists of the identical elements as the indicator 10c illustrated in FIG. 7.

Figure 10:
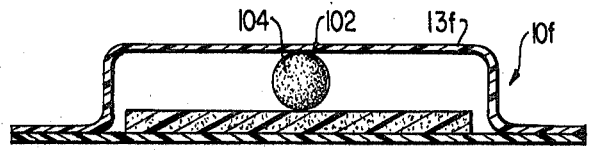
FIG. 10 shows yet another form of warm-up indicator.

While each embodiment of the warm-up indicator is shown in conjunction with a planar sheet of indicator material, it is to be understood that the indicator could comprise a layer of fibers or flocking coated upon the outside surface of the containers or capsules housing the expansible liquids. For example, in FIG. 10, container 102 can be coated with fibers or flocking 104 on its exterior surface. A color change on the surface of the container would be visible through the transparent dome 13f. In all other respects, the operation of indicator 10f is identical to that of indicator 10 illustrated in FIG. 1.

The liquid used in each of the disclosed warm-up indicators may consist of either a pure component or a mixture of components which is capable of freezing with the necessary expansion, but without significant disproportionation or change in composition of the liquid and solid that can exist in quasiequilibrium contact during the process. Minor additives may be included to produce the necessary color-producing reaction, for nucleation of freezing, or for viscosity control. For example, the liquid may consist primarily of pure water for an indicator whose melting temperature approximates 32°F. As a second example, the liquid may consist primarily of a eutectic composition comprising a mixture of 19.7 percent by weight of potassium chloride to 80.3 percent by weight of water, for an indicator whose melting temperature is approximately 12°F.

The additive in the liquid for producing the necessary color change reaction may consist of hydrochloric acid sufficient to produce a pH of approximately 3.0 to 3.5; in this case, the indicator material may be a porous solid, impregnated with an alcoholic solution containing 0.08 percent by weight of methyl red and about 0.15 percent by weight of sodium hydroxide, and the color change is from yellow to red.

No crystallization catalyst, or additive for nucleation of freezing, is necessary for indicators which are to be frozen at a temperature below the undercooling range of the liquid. In fact, the occurrence of undercooling during the freezing may be of benefit in that the rapid freezing of the undercooled liquid and the associated rapid expansion may fracture the capsule more reliably than slow isothermal freezing, which might allow plastic creep of the container wall to accomodate the volume change without fracture.

On the other hand, an irreversible temperature indicator of this type may be used to protect materials that must be maintained above its melting temperature, rather than below, for the color change is evidence of both freezing and subsequent remelting of the liquid. In that case, it is desirable that freezing of the liquid occur without undercooling, and addition of a crystallization catalyst may be desirable. For this purpose any of the known crystallization catalysts suited for use in the specific eutectic or other composition used as the liquid may be employed. For example, if the liquid is primarily pure water or an aqueous solution, the crystallization catalyst may be 0.1 percent by weight of finely divided silver iodide.

The additive for control of viscosity, or thickener, may consist of 3 to 4 percent by weight of sodium carboxymethylcellulose. An increase in viscosity over that of the pure eutectic liquid may be desirable to insure that the color indication appear only after a sufficient length of time for the chance of spoilage at the existing temperature to be significant.

What is claimed is:

1. A device for indicating that a refrigerated object has undergone rewarming, said device comprising
   a sealed package adapted to be placed in proximity to said object, said package including
   an upper portion having a substantially rigid dome which does not deform under its own weight and which exerts a bias on deformation from its normal form,
   a bottom portion sealed along its edges to said upper portion to form with said upper portion a substantially rigid envelope, at least part of said upper and-/or bottom portion being transparent,
   at least one frangible container within said envelope housing a liquid expansible upon freezing to fracture said container, said liquid having a melting temperature above the refrigeration temperature, the container being disposed between the upper and bottom portions under bias of both portions,
   an indicator material, which exhibits a substantial color change when placed in contact with said liquid adjacent said container within said envelope in proximity to a transparent area of said envelope,
   whereby said liquid can be refrigerated with said object and upon freezing expand to fracture said container to enable communication to be established between the interior of said container and the indicator material so that if subsequent thawing of said liquid occurs in response to rewarming of said object the pressure applied by said bottom portion against said uppoer portion will cause said liquid to flow from said fractured container into contact with said indicator material.

2. A device in accordance with claim 1 wherein said bottom portion includes a resilient member.

3. A device in accordance with claim 2 wherein said resilient member is compressed elastomer foam pad.

4. A device in accordance with claim 2 wherein said bottom portion is a ring of thin elastic material.

5. A device in accordance with claim 2 wherein said bottom portion is a helical compression spring 6. A device in accordance with claim 2 wherein said bottom portion is a sealed container holding a captive gas.

7. A device in accordance with claim 2 wherein said container is formed by deformations formed in the dome of said package and an interior seal between said deformations to form a liquid chamber, and
   said bottom portion including an indenter having a convex surface exerting a bearing force on said seal.

8. A device in accordance with claim 1 including more than one frangible container filled with a liquid which expands upon freezing, and
   the liquids in said containers having different melting points so that they are capable of progressively melting as said frozen object thaws, whereby the amount of color change visible on said indicator material is a direct function of the temperature to which said frozen object has been subjected to cause it to melt.

9. A device in accordance with claim 8 wherein said bottom portion includes a plurality of resilient tongues cut in said indicator material forming seats for each of said containers.

10. A device in accordance with claim 2 wherein said bottom portion includes a resilient tongue cut in said indicator material forming a seat for said container.

11. A device in accordance with claim 1 wherein said bottom portion develops a force insufficient to fracture said frangible container.

12. A device in accordance with claim 1 wherein said indicator material is a coating on the outer surface of said frangible container.

13. A device in accordance with claim 1 wherein said expansible liquid is of a composition capable of substantially complete isothermal freezing and remelting.

14. A device in accordance with claim 1 wherein said expansible liquid is essentially pure water.

15. A device in accordance with claim 1 wherein said expansible liquid is a eutectic composition consisting of a mixture of 19.7 percent by weight of potassium chloride to 80.3 percent by weight of water.

16. A device in accordance with claim 1 wherein a crystallization catalyst is added to the expansible liquid.

17. A device in accordance with claim 14 wherein a crystallization catalyst is added to said pure water, said catalyst comprising 0.1 percent by weight of finely divided silver iodide.

18. A device in accordance with claim 1 wherein said expansible liquid includes a thickener for viscosity control.

19. A device in accordance with claim 18 wherein said thickener consists of 3 to 4 percent by weight of sodium carboxymethylcellulose.

* * * * *